United States Patent [19]

Bicker et al.

[11] Patent Number: 4,900,523

[45] Date of Patent: Feb. 13, 1990

[54] PROCESS FOR REMOVING CYANOGEN HALIDES AND PHOSGENE FROM WASTE GASES

[75] Inventors: Richard Bicker, Liederbach; Manfred Schrod, Weiterstadt; Hans Militzer, Hofheim am Taunus, all of Fed. Rep. of Germany

[73] Assignee: Hoechst Aktiengesellschaft, Frankfurt am Main, Fed. Rep. of Germany

[21] Appl. No.: 312,296

[22] Filed: Feb. 17, 1989

Related U.S. Application Data

[63] Continuation of Ser. No. 77,319, Jul. 24, 1987, abandoned.

[30] Foreign Application Priority Data

Jul. 26, 1986 [DE] Fed. Rep. of Germany ....... 3625378

[51] Int. Cl.$^4$ .................................................. C01C 3/00
[52] U.S. Cl. ..................................... 423/236; 423/240
[58] Field of Search ................ 423/236, 240, 383, 384, 423/414, 415 R, 462

[56] References Cited

U.S. PATENT DOCUMENTS

| | | | |
|---|---|---|---|
| 1,789,194 | 1/1931 | Rockwell | 423/236 |
| 2,612,423 | 9/1952 | Rockwell et al. | 423/236 |
| 3,142,535 | 7/1964 | Christoph | 423/245 R |
| 3,568,408 | 3/1971 | Riethmann et al. | 55/71 |
| 3,645,852 | 2/1972 | Axen et al. | 195/68 |
| 3,856,921 | 12/1974 | Shrier et al. | 423/240 R |
| 3,876,501 | 4/1975 | Hanushewsky | 195/68 |
| 3,935,072 | 1/1976 | Chibata et al. | 195/68 |
| 4,064,218 | 12/1977 | Scholz et al. | 423/240 |
| 4,451,396 | 5/1984 | Di Marchi | 260/112 R |
| 4,493,818 | 1/1985 | Gross | 423/240 |

FOREIGN PATENT DOCUMENTS 0134070 3/1985 European Pat. Off. .

OTHER PUBLICATIONS

Gross et al., J. Amer. Chem. Soc., 1961, pp. 1510–1511.

*Primary Examiner*—Robert L. Stoll
*Attorney, Agent, or Firm*—Finnegan, Henderson, Farabow, Garrett and Dunner

[57] ABSTRACT

Cyanogen halides and/or phosgene are removed from waste gases by bringing the waste gases into intimate contact with an aqueous solution of at least one amine of the formula $NR_3$; in the formula, 1 or 2 of the radicals R represent an alkanol or alkylamine group having 2 or 3 carbon atoms in each case, where H and/or $C_1$–$C_2$-alkyl is bound to the nitrogen of the amine group, and the remaining groups R are H or $C_1$–$C_4$-alkyl.

7 Claims, No Drawings

PROCESS FOR REMOVING CYANOGEN HALIDES AND PHOSGENE FROM WASTE GASES

This application is a continuation of application Ser. No. 07/077,319, filed July 24, 1987, now abandoned.

DESCRIPTION

Due to its high chemical reactivity, phosgene is produced in large quantities and is mainly reacted with amines to form isocyanates. Isocyanates are valuable intermediates in the preparation of polyurethanes, for example in paints, surface coatings, adhesives, medicaments and plant-protection agents. In spite of its toxicity, phosgene is therefore an indispensible raw material in the chemical industry.

Due to the toxicity, phosgene emissions must be kept as low as possible, which is also expressed in corresponding state regulations (eg. West German (TA Luft) clean air regulations). Phosgene-containing waste gases are usually washed chemically with sodium hydroxide solution, a very wide variety of types of scrubber being used. A problem here is to reduce the phosgene concentration in the gas stream to very low values by washing, to which purpose large-scale scrubbers have been necessary hitherto since it has hitherto not been possible to fulfil, in an ideal manner, the prerequisites for effective washing—rapid chemical reaction and good materials exchange between the gaseous and liquid phases.

Cyanogen halides are also chemically very reactive compounds and are employed to an increasing extent, for example, for activating polymeric supports for anchoring enzymes (U.S. Pat. No. 3,645,852; U.S. Pat. No. 3,876,501 and U.S. Pat. No. 3,935,072) and for chemical binding of antibodies in affinity chromatography and, since biochemical processes are becoming more and more important, in the preparation, for example, of enzymes, yeasts, medicaments, amino acids and citric acid, inter alia. Likewise, they are used in specific cleavage of peptides and proteins at methionine for controlled fragmenting of long peptide chains (see E. Gross and B. Wittkopp, J. Amer. Chem. Soc. 83, 1510 (1961), and European Offenlegungsschrift 134,070).

Cyanogen chloride is a byproduct of acrylonitrile production and is obtained in large amounts from hydrocyanic acid and chlorine, it usually being converted immediately into cyanuric chloride. Cyanuric chloride is a starting material for, inter alia, melamine resins and herbicides based on triazines.

The abovementioned cyanogen halides, like phosgene, are also very toxic compounds; polluted gas streams must therefore be washed very thoroughly. Cyanogen bromide and, above all, cyanogen chloride react with NaOH markedly more slowly than does phosgene, so that gas scrubbers using NaOH are even less effective than for phosgene. In other words, the respective scrubbers must be dimensioned even larger than in the case of phosgene in order to obtain very low final concentrations in the waste gas.

For small gas streams, packed columns are usually used, but these cause a high pressure loss, so that that spray scrubbers are used for large amounts of gas.

Although, in principle, virtually complete conversion of the toxic gases and vapors mentioned is possible in the abovementioned types of scrubber, the apparatus used must be very large-scale. However, the degree of separation for a gas can be increased, in addition to industrial dimensioning of the scrubber, ie. with respect to the size, or by using packing elements, also, in principle, by using another wash liquid.

A suitable absorbent should meet a number of demands, namely a higher chemical reactivity than alkali metal hydroxide, good material transfer properties, a low vapor pressure and the least possible inherent odor, and should also be miscible with water, preferably readily soluble therein, and should be relatively easily accessible.

It has now been found that amines of the formula $NR_3$ in which one or two of the radicals R represent an alkanol or alkylamine group having 2 or 3 carbon atoms in each case and having a terminal hydroxyl or amine group and where hydrogen and/or alkyl having 1 or 2 carbon atoms is bound to the nitrogen of the amine group, and in which the remaining R groups are hydrogen or alkyl having 1 to 4, preferably 1 to 2, carbon atoms, fulfill the abovementioned requirements to a great extent, indeed considerably better than ammonia and inorganic bases and also more highly substituted amines, such as triethanolamine. This is apparent from Table 1 below, where the percentage data for the bases relate to aqueous solutions and the relative degrees of separation DS relate to 10% strength solutions of diethylaminoethanol, and the relative degree of separation is defined as $$\frac{C_{in} - C_{out}}{C_{in}} \times 100.$$

TABLE 1

| | Relative degrees of separation (DS) in % for ClCN at 25° C. for various bases as wash liquid | | | | |
|---|---|---|---|---|---|
| Base: | NaOH (20%) | NH$_3$ (25%) | Triethanolamine (10%) | Diethanolamine (10%) | Diethylaminoethanol (10%) |
| DS | 1 | 20 | 2 | 60 | 100 |

Compared to the known state of the art, the use as wash liquid for washing waste gases containing, for example, COCl$_2$ and ClCN, of the amines used according to the invention represents a considerable advance, above all since contamination of the environment is thereby reduced. In each case, significantly higher degrees of separation are found, under identical conditions, using these amines than using pure sodium hydroxide solution. This can be attributed, on the one hand, to the significantly higher chemical reactivity, as can be seen from Table 2 from the rate constant. For ClCN, for example, the rate constants are increased by 2 orders of magnitude.

TABLE 2

| Rate constant for ClCN at 20° C. | |
|---|---|
| NaOH | 2 (s$^{-1}$) |
| Dimethylamino ethanol (Dimethol) | 130 (s$^{-1}$) |
| Diethylamino ethanol (Diethol) | 60 (s$^{-1}$) |

The amines used according to the invention are generally contained in the wash liquid in a concentration of about 2 to 20, preferably about 5 to 15, % by weight. They can also be employed combined with alkali metal hydroxides, in particular NaOH. In this case, the alkali metal hydroxide is generally present in a concentration up to about 25, preferably from about 5 to 20, % by weight. This has the advantage that the amines employed according to the invention are regenerated by the alkalis after reacting with the cyanogen halide or phosgene.

In the process according to the invention, the waste gas containing phosgene or cyanogen halide is contacted with the absorbent in a suitable absorption apparatus, expediently at a temperature of about 0 to 80, preferably about 5° to 40° C. During this process, the halogen-containing toxins mentioned pass over into the liquid phase and are chemically converted therein.

The process according to the invention can be designed in a very wide variety of ways. Preferably, the gas and the wash liquid are passed in countercurrent to one another. It is vital that the wash liquid and the gas are brought into intimate contact, ie. that both are brought into contact with one another over a large surface area, so that the materials exchange in this two-phase reaction takes place readily.

Sufficient suitable designs are known in industry, such as packed or plate columns, for example with bubble cap plates, or water ring pumps. An embodiment in which the gas and the liquid are not passed in countercurrent comprises carrying out the process in a spray apparatus, ie. one in which the gas and the liquid are sprayed in the fashion of a water-jet pump. The processing principle which is used in practice depends on the volume of the gas stream and of the washing agent and on the dimensions of the apparatuses which are already present and the materials exchange surface area produced therewith. The absorbent can be used with pump circulation and with continuous circulation. At the same time, it must be taken into account that the surface tension of the wash liquid is reduced by the amines used according to the invention and the effective materials exchange surface area is thereby enlarged. This has a positive effect on the degree of separation.

In the following examples, the measurements were carried out in a spray scrubber and in a bubble absorber. The temperature of the wash liquid was 20° C. The results are reproduced in Tables 4 to 8, in which $V_G$ denotes the gas flow (m³/h)
$V_L$ denotes the liquid flow (l/h)
t denotes the gas residence time in the scrubber (s)
C denotes the % by weight of the base in water (%).

Some relevant physical data for dimethol and diethol are collated in Table 3.

TABLE 3

| Physical data | dimethol | diethol |
| --- | --- | --- |
| Molecular weight | 89.4 | 117.2 |
| Assay | over 99% | over 99% |
| H₂O content | max. 5% | max. 5% |
| b.p. (1.013 bar) | 134.6° C. | 162.1° C. |
| Melting point | below −70° C. | −70° C. |
| Density | 0.887 (g/ml) | 0.885 (g/ml) |
| Vapor pressure (20° C.) | 6.13 mbar | 1.87 mbar |
| Viscosity (25° C.) | ca. 3.5 mPa.s | ca. 4.3 mPa.s |
| Surface tension (24.5° C.) | 27.1 (mN/m) | |

EXAMPLES (1) In a spray scrubber, the degree of separation for ClCN is measured for various wash liquids as a function of the residence time. The diffuser length was 800 mm. The results are collated in Table 4.

TABLE 4

Absorption of cyanogen chloride using various absorbents ($V_L$ = 50 l/h)

| Gas residence time | Degree of separation DS [%] | | | |
| --- | --- | --- | --- | --- |
| t [s] → | 0.1 | 0.22 | 0.63 | 1.48 |
| Wash medium | | | | |
| NaOH - 10% strength | 14.3 | 31.4 | 56.4 | 82.1 |
| NH₃ - 9% strength | 33.5 | 51.4 | 73.6 | 90.0 |
| Ethanolamine, 10% strength | 36.8 | 60.7 | 83.6 | 95.7 |
| Diethol, 10% strength | 40.0 | 62.8 | 86.4 | 98.6 |
| Dimethol, 10% strength | 50.3 | 74.3 | 91.4 | 98.6 |

(2) A procedure was followed as in Example 1, but always using a 10% strength concentration and using another spray washer with diffuser length 270 mm. For the results, see Table 5.

TABLE 5

Absorption of ClCN using various absorbents ($V_L$ = 50 l/h)

| Gas residence time | Degree of separation DS [%] | | | |
| --- | --- | --- | --- | --- |
| t [s] → | 0.05 | 0.1 | 0.22 | 0.5 |
| Wash medium | | | | |
| NaOH | 17.8 | 30.7 | 50.7 | 73.9 |
| Ethanolamine | 37.8 | 56.4 | 73.6 | 91.4 |
| Dimethol | 50.0 | 70.0 | 85.7 | 96.4 |

(3) The dependency of the degree of separation for ClCN on the diethol concentration at short residence times (t=0.22 s) was measured in a spray scrubber. The diffuser length was 800 mm. For the results, see Table 6.

TABLE 6

Absorption of cyanogen chloride as a function of the diethol concentration ($V_L$ = 50 l/h)

| Degree of separation DS (%) | 45 | 60 | 62.5 | 69.1 |
| --- | --- | --- | --- | --- |
| Diethol concentration [% by weight] | 1.25 | 5.9 | 10 | 20 |

(4) The dependency of the degree of separation for phosgene in various absorbents at a 10% concentration in water in spray scrubbers with various diffusers was measured. For results, see Table 7.

TABLE 7

Phosgene absorption in various absorbents ($V_L$ = 50 l/h; $V_G$ = 2 m³/h)

| | Degree of separation [%] Diffuser length | |
| --- | --- | --- |
| Wash medium | 270 [mm] | 800 [mm] |
| NaOH | 47.9 | 59.7 |
| Diethol | | 60.0 |
| Dimethol | 61.6 | 74.7 |
| Ethanolamine | 48.9 | 60.5 |

(5) The dependency of the relative degree of separation for ClCN of various wash liquids at 25° C. was determined, relative to 100% strength diethol. The measurement was carried out in a bubble absorber and related to 20% strength NaOH. The results are reproduced in Table 8. From this, it can be seen that, due to the odor which occurs, aminoethanol and diaminoethane are excluded as wash liquid in spite of their good degree of separation.

TABLE 8

ClCN absorption (relative) in various wash liquids at 25° C. in a bubble adsorber

| Relative degree of separation [%] | 1.0 | 90.0 | 99.0 | 100 | 99.6 | 99.6 |
|---|---|---|---|---|---|---|
| Wash Liquid | NaOH | NH$_3$ | diethol | diethol | ethanol-amine | diamino-ethan |
| [%] | 20 | 25 | 10 | 100 | 10 | 10 |

(6) The degree of separation for BrCN was determined in a spray scrubber. In this determination, a gas volume $V_{gas}=1.5$ m$^3$/h of N$_2$ containing 5,000 ppm of BrCN was washed with a liquid stream $V_L=40$ l/h. A degree of separation of 77% was obtained using 10% strength NaOH, and a degree of separation of 91% using a 10% strength aqueous dimethol solution.

We claim:

1. A process for removing cyanogen halides and/or phosgene from waste gases containing said cyanogen halides and/or phosgene, by washing with aqueous solutions of bases, wherein the waste gas is brought into intimate contact with a wash liquid which contains as active components 2 to 20% by weight of dimethylaminoethanol or diethylaminoethanol or a combination of both and an alkali metal hydroxide in a concentration of up to about 25% by weight.

2. The process as claimed in claim 1, wherein the washing is carried out at a temperature of about 0° to 80° C.

3. The process as claimed in claim 2, wherein the washing is carried out at a temperature of about 5° to 40° C.

4. The process as claimed in claim 1, wherein the waste gas and the wash liquid are passed countercurrent to one another.

5. The process as claimed in claim 1, wherein the dimethylaminoethanol and/or diethylaminoethanol is contained in the wash liquid in a concentration of about 5 to 15% by weight.

6. The process as claimed in claim 1, wherein the alkali metal hydroxide is sodium hydroxide.

7. The process as claimed in claim 1, wherein the concentration of the alkali metal hydroxide is about 5 to 20% by weight.

* * * * *